(12) United States Patent
Hagihara et al.

(10) Patent No.: US 12,075,530 B2
(45) Date of Patent: Aug. 27, 2024

(54) ARTICLE WITH CONDUCTIVE SHEET AND METHOD FOR PRODUCING SAME

(71) Applicant: LINTEC CORPORATION, Tokyo (JP)

(72) Inventors: Yoshiaki Hagihara, Tokyo (JP); Masaharu Ito, Tokyo (JP); Takashi Morioka, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 724 days.

(21) Appl. No.: 17/270,809

(22) PCT Filed: Jul. 29, 2019

(86) PCT No.: PCT/JP2019/029566
§ 371 (c)(1),
(2) Date: Feb. 23, 2021

(87) PCT Pub. No.: WO2020/044903
PCT Pub. Date: Mar. 5, 2020

(65) Prior Publication Data
US 2021/0321491 A1    Oct. 14, 2021

(30) Foreign Application Priority Data
Aug. 29, 2018 (JP) .................. 2018-160469

(51) Int. Cl.
*H05B 3/14* (2006.01)
*B32B 7/12* (2006.01)
*B32B 37/12* (2006.01)
*H05B 3/03* (2006.01)
*H05B 3/20* (2006.01)

(52) U.S. Cl.
CPC ............... *H05B 3/14* (2013.01); *B32B 7/12* (2013.01); *B32B 37/12* (2013.01); *H05B 3/03* (2013.01); *H05B 3/20* (2013.01); *B32B 2307/202* (2013.01)

(58) Field of Classification Search
CPC .... H05B 3/14; H05B 3/03; H05B 3/20; B32B 7/12; B32B 37/12; B32B 2307/202
USPC ....... 219/202, 203, 213, 480, 481, 488, 530, 219/537, 538, 541, 548
See application file for complete search history.

(56) References Cited

U.S. PATENT DOCUMENTS

2010/0200286 A1* 8/2010 Melcher .................. G02F 1/155
174/261
2013/0251619 A1 9/2013 Rikihisa et al.
2014/0339212 A1* 11/2014 Arslan ..................... H05B 3/86
219/203

FOREIGN PATENT DOCUMENTS

| CN | 108293275 A | 7/2018 |
| EP | 1722599 A | 11/2006 |
| JP | H10-106726 A | 4/1998 |

(Continued)

OTHER PUBLICATIONS

Extended European Search Report issued for the corresponding European Patent Application No. 19855202.8 on Apr. 26, 2022.

(Continued)

*Primary Examiner* — Phuong T Nguyen
(74) *Attorney, Agent, or Firm* — Rimon P.C.

(57) ABSTRACT

A method of producing a conductive-sheet-equipped article includes: forming electrodes on an adherend to obtain an electrode-equipped adherend; and stretching and sticking a sheet-shaped conductive member to the electrode-equipped adherend.

6 Claims, 5 Drawing Sheets

(56) References Cited

FOREIGN PATENT DOCUMENTS

| | | | |
|---|---|---|---|
| JP | 2001-214091 A | 8/2001 | |
| JP | 2009-193904 A | 8/2009 | |
| JP | 2010-061834 A | 3/2010 | |
| JP | 2010061834 * | 3/2010 | ............... H05B 3/14 |
| JP | 2012-126635 A | 7/2012 | |
| JP | 2016-143538 A | 8/2016 | |
| JP | 2018-039226 A | 3/2018 | |
| WO | 2018/097321 A1 | 5/2018 | |
| WO | 2018/097322 A1 | 5/2018 | |

OTHER PUBLICATIONS

Chinese Office Action issued for the corresponding Chinese Patent Application No. 201980055841.3 on May 13, 2022, with English translation.
International Preliminary Report on Patentability issued in corresponding International Patent Application No. PCT/JP2019/029566, dated Mar. 2, 2021, with English translation.
International Search Report issued in corresponding International Patent Application No. PCT/JP2019/029566, dated Oct. 15, 2019, with English translation.

* cited by examiner

ARTICLE WITH CONDUCTIVE SHEET AND METHOD FOR PRODUCING SAME

CROSS-REFERENCE TO RELATED APPLICATIONS

This application is the U.S. National Phase under 35 U.S.C. § 371 of International Application No. PCT/JP2019/029566, filed on Jul. 29, 2019, which claims the benefit of Japanese Application No. 2018-160469, filed on Aug. 29, 2018, the entire contents of each are hereby incorporated by reference.

TECHNICAL FIELD

The present invention relates to an article equipped with a conductive sheet and a method of producing the article.

BACKGROUND ART

A sheet-shaped conductive member (hereinafter, also referred to as "conductive sheet") is usable as members for a variety of articles such as a heat-generating element of a heat generator, a material of a heat-generating textile, and a protection film (an anti-crash film) for a display. As the sheet-shaped conductive member, for instance, a member having a layer in which conductive particles such as tin-doped indium oxide are dispersed or a member including a quasi-sheet structure including a plurality of conductive linear bodies arranged at an interval is used.

As a sheet intended to be used as a heat-generating element, for instance, Patent Literature 1 describes a heat-generating sheet including a quasi-sheet structure including a plurality of unidirectionally extending linear bodies arranged at an interval. The heat-generating sheet includes the quasi-sheet structure including the conductive linear bodies having a diameter of 7 μm to 75 μm and a resin protection layer disposed on one surface of the quasi-sheet structure. Further, in the heat-generating sheet, a total thickness of a layer disposed on the surface of the quasi-sheet structure on the side provided with the resin protection layer is 1.5 times to 80 times as large as the diameter of each of the conductive linear bodies.

CITATION LIST

Patent Literature(s)

Patent Literature 1: International Publication No. WO 2018/097321

SUMMARY OF THE INVENTION

Problem(s) to be Solved by the Invention

In a heat generator including a sheet as described in Patent Literature 1, a heat-generating element (sheet-shaped conductive member) and electrodes are formed integrally with each other. The produced heat generator is incorporated into a desired use location and used. However, the electrodes, which are typically hard, are disadvantageously difficult to bend or stretch and thus less conformable to a curved surface or the like of an adherend. In addition, even when the electrodes are provided by vapor deposition or with a conductive adhesive agent or the like, if the electrodes are provided on a side of the sheet-shaped conductive member where the heat-generating element is provided, generation of a crack resulting from stretching the sheet-shaped conductive member is of concern. Further, in a case where either of a heat-generating portion and the electrodes, which are integrally formed, need to be revised, the entire design needs to be revised with time and effort.

Meanwhile, consideration is given to a method in which the electrodes are provided on the sheet-shaped conductive member after the sheet-shaped conductive member is installed on an installation surface. However, when this method is used, a producing method may become complicated depending on a configuration of the sheet-shaped conductive member. For instance, in a case where the sheet-shaped conductive member includes a layer other than the quasi-sheet structure on a top surface, the electrodes need to be exposed at portions of the sheet-shaped conductive member where the electrodes are installed so that the quasi-sheet structure and the electrodes come into contact with each other.

An object of the invention is to provide a method of producing an article equipped with a conductive sheet and the article equipped with the conductive sheet, the conductive sheet being conformable to a curved surface or the like of an adherend and allowing for an improvement in efficiency by considering separate adjustments of electrodes and a conductive portion.

Means for Solving the Problem(s)

According to an aspect of the invention, a method of producing a conductive-sheet-equipped article includes: forming electrodes on an adherend to obtain an electrode-equipped adherend; and stretching and sticking a sheet-shaped conductive member to the electrodes-equipped adherend.

In the method according to the above aspect, it is preferable that the sheet-shaped conductive member has a quasi-sheet structure including a plurality of conductive linear bodies arranged at an interval.

In the method according to the above aspect, it is preferable that the conductive linear bodies each include at least one selected from the group consisting of a linear body including a metal wire, a linear body including a carbon nanotube, and a linear body in a form of a conductive-coated yarn.

In the method according to the above aspect, it is preferable that the sheet-shaped conductive member further includes a base, and a side of the sheet-shaped conductive member where the quasi-sheet structure is provided is stuck to the electrodes-equipped adherend.

In the method according to the above aspect, it is preferable that the sheet-shaped conductive member further includes an adhesive agent layer.

In the method according to the above aspect, it is preferable that the conductive linear bodies are each in a wavy shape in a plan view of the sheet-shaped conductive member.

According to another aspect of the invention, a conductive-sheet-equipped article includes: an adherend having a curved surface; non-stretchable electrodes provided at least partly on the curved surface of the adherend; and a sheet-shaped conductive member provided on the curved surface of the adherend and on the electrodes and including a quasi-sheet structure including a plurality of conductive linear bodies arranged at an interval.

The aspects of the invention enable to provide a method of producing an article provided with a conductive sheet and the article provided with the conductive sheet, the conductive sheet being conformable to a curved surface or the like of an adherend and allowing for an improvement in efficiency by considering separate adjustments of electrodes and a conductive portion.

DESCRIPTION OF EMBODIMENT(S)

First Exemplary Embodiment

Description will be made below on the invention with reference to the attached drawings with exemplary embodiments cited as an example. The invention is not limited to the contents of the exemplary embodiments. It should be noted that some parts are shown on an enlarged scale or a reduced scale in the drawings for the convenience of explanation.

Sheet-Shaped Conductive Member

First, description will be made on a sheet-shaped conductive member used in a method of producing an article equipped with a conductive sheet (hereinafter also referred to as a conductive-sheet-equipped article) according to a first exemplary embodiment.

Figure 1:
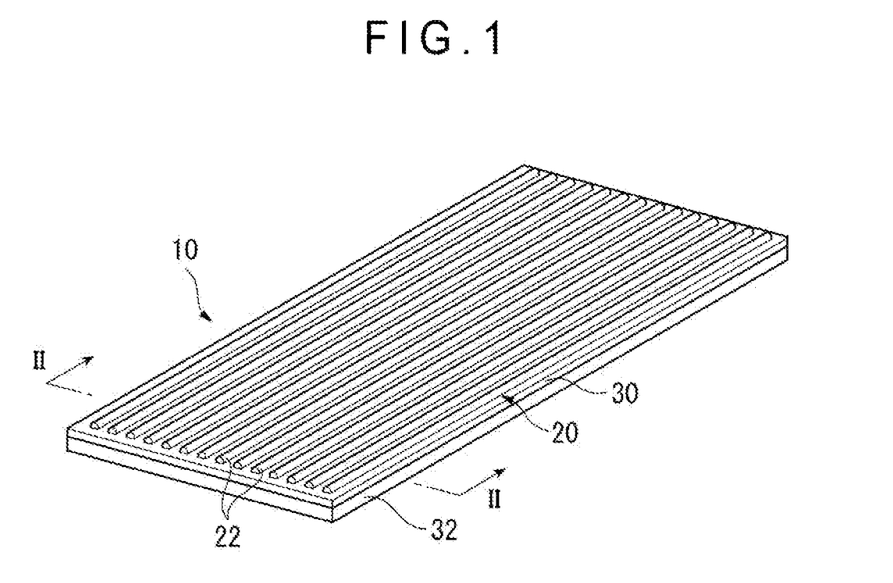
FIG. 1 is a schematic view of a sheet-shaped conductive member according to a first exemplary embodiment of the invention.
Figure 2:
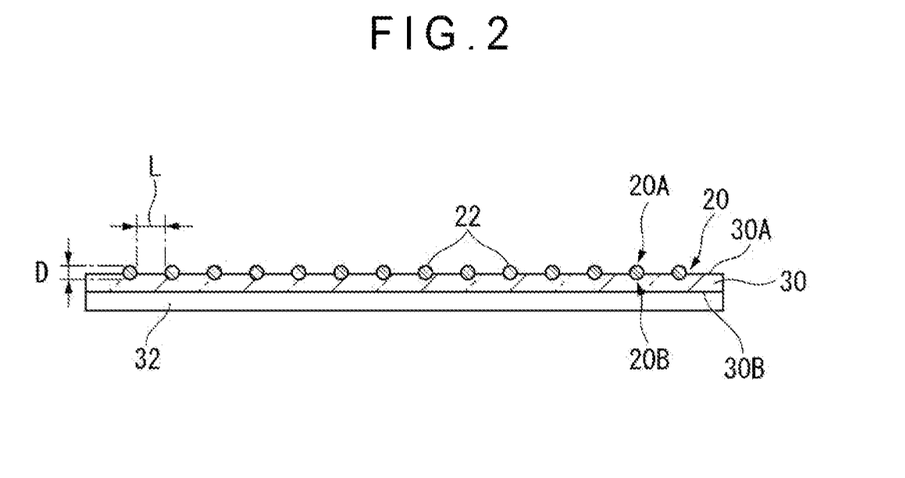
FIG. 2 is a cross sectional view of a cross section taken along a line II-II in FIG. 1.

A sheet-shaped conductive member 10 according to the first exemplary embodiment includes, for instance, a quasi-sheet structure 20, an adhesive agent layer 30, and a base 32 as shown in FIG. 1 and FIG. 2. Specifically, for instance, in the sheet-shaped conductive member 10, the quasi-sheet structure 20 is stacked on the base 32 the adhesive agent layer 30.

It should be noted that 20A denotes one surface of the quasi-sheet structure 20 (hereinafter, referred to as "first surface 20A") opposite a surface on which the adhesive agent layer 30 is stacked. 20B denotes the other surface of the quasi-sheet structure 20 (hereinafter, referred to as "second surface 20B") on which the adhesive agent layer 30 is stacked (see FIG. 2). 30A denotes one surface of the adhesive agent layer 30 (hereinafter, referred to as "first adhesive surface 30A") on which the quasi-sheet structure 20 is stacked. 30B denotes the other surface of the adhesive agent layer 30 (hereinafter, referred to as "second adhesive surface 30B") opposite the surface on which the quasi-sheet structure 20 is stacked (see FIG. 2).

In other words, in the sheet-shaped conductive member 10 according to the exemplary embodiment, the quasi-sheet structure 20 and the adhesive agent layer 30 are stacked on each other with the second surface 20B of the quasi-sheet structure 20 and the first adhesive surface 30A of the adhesive agent layer 30 facing each other. In addition, the base 32 is stacked on the second adhesive surface 30B of the adhesive agent layer 30.

Quasi-Sheet Structure

It is preferable that the sheet-shaped conductive member 10 used for the method of producing a conductive-sheet-equipped article according to the exemplary embodiment include the quasi-sheet structure 20 so that the sheet-shaped conductive member 10 is easily stretched. The quasi-sheet structure 20 has a structure where a plurality of unidirectionally extending conductive linear bodies 22 are arranged at an interval therebetween. Specifically, for instance, the quasi-sheet structure 20 has a structure where the plurality of linearly extending conductive linear bodies 22 are arranged at regular intervals in a direction perpendicular to a length direction of the conductive linear bodies 22. In other words, the quasi-sheet structure 20 has, for instance, a structure where the conductive linear bodies 22 are arranged in stripes.

A volume resistivity R of the conductive linear body 22 is preferably in a range from $1.0 \times 10^{-9}$ Ω·m to $1.0 \times 10^{-3}$ Ω·m, more preferably in a range from $1.0 \times 10^{-8}$ Ω·m to $1.0 \times 10^{-4}$ Ω·m. At the volume resistivity R of the conductive linear bodies 22 in the above range, a surface resistance of the quasi-sheet structure 20 is likely to decrease.

A method of measuring the volume resistivity R of the conductive linear bodies 22 is as follows. A silver paste is applied to both ends of the conductive linear bodies 22 and a resistance of a portion at a length of 40 mm from each end is measured to calculate a resistance value of the conductive linear bodies 22. Further, the resistance value is multiplied by a cross sectional area (unit: $m^2$) of the conductive linear bodies 22 and the obtained value is divided by the measured length (0.04 m) to calculate the volume resistivity R of the conductive linear bodies 22.

Although a shape of the cross section of the conductive linear bodies 22 is not limited and may be a polygonal shape, a flat shape, an oval shape, a circular shape, or the like, an oval shape or a circular shape is preferable in terms of, for instance, affinity to the adhesive agent layer 30.

In a case where the cross section of the conductive linear bodies 22 is in a circular shape, a diameter D of each of the conductive linear bodies 22 is preferably in a range from 5 μm to 75 μm. In terms of a reduction in a rise in sheet resistance and an improvement in heat generation efficiency and anti-insulation/breakage properties in a case where the sheet-shaped conductive member 10 is used as a heat-generating element, the diameter D of the conductive linear bodies 22 is more preferably in a range from 8 μm to 60 μm, further preferably in a range from 12 μm to 40 μm.

It should be noted that at the diameter D of the conductive linear bodies 22 in a range from 5 μm to 75 μm, in a case where the conductive linear bodies 22 are linear bodies in a wavy shape as described later, the conductive linear bodies 22 in a wavy shape are unlikely to be prevented from being straightened by an adjacent layer (the adhesive agent layer 30 or the like) when the sheet-shaped conductive member 10 is three-dimensionally formed.

In a case where the cross section of the conductive linear bodies 22 is in an oval shape, it is preferable that a long diameter be in a range similar to that of the above diameter D.

The diameter D of the conductive linear body 22 is an average value of results of measuring the diameter of the conductive linear bodies 22 at five spots selected at random by observing the conductive linear bodies 22 of the quasi-sheet structure 20 with a digital microscope.

An interval L between the conductive linear bodies 22 is preferably in a range from 0.3 mm to 12.0 mm, more preferably in a range from 0.5 mm to 10.0 mm, further preferably in a range from 0.8 mm to 7.0 mm.

At the interval L between the conductive linear bodies 22 in a range from 0.3 mm to 12.0 mm, in a case where the sheet-shaped conductive member 10 includes the adhesive agent layer 30, an exposed area of the adhesive agent layer 30 exposed between the conductive linear bodies 22 is ensured, whereby the bonding by the adhesive agent layer 30, which is exposed through the quasi-sheet structure 20, can be prevented from being disturbed by the conductive linear bodies 22. Further, with the interval between the conductive linear bodies 22 being within the above range, the conductive linear bodies are dense to some extent, allowing for keeping the resistance of the quasi-sheet structure low to improve a function of the sheet-shaped conductive member 10 such as equalization of distribution of temperature rise in a case where the sheet-shaped conductive member 10 is used as a heat-generating element.

For the interval L between the conductive linear bodies 22, an interval between adjacent two of the conductive linear bodies 22 is measured by observing the conductive linear bodies 22 of the quasi-sheet structure 20 with a digital microscope.

It should be noted that the interval between adjacent two of the conductive linear bodies 22 is a length along a direction in which the conductive linear bodies 22 are arranged, that is, a length between facing portions of the two conductive linear bodies 22 (see FIG. 2). In a case where the conductive linear bodies 22 are arranged at irregular intervals, the interval L is an average value of intervals between all the adjacent ones of the conductive linear bodies 22. However, in terms of controllability of the value of the interval L, or the like, the conductive linear bodies 22 are preferably arranged substantially at regular intervals in the quasi-sheet structure 20, more preferably arranged at regular intervals.

In a case where the conductive linear bodies 22 are each in a wavy shape as described later, the conductive linear bodies 22 are partially closer to each other than the interval L due to the curvature or bend of the conductive linear bodies 22 and, accordingly, it is sometimes preferable that the interval L be wider. In such a case, the interval L between the conductive linear bodies 22 is preferably in a range from 1 mm to 30 mm, more preferably in a range from 2 mm to 20 mm.

The conductive linear bodies 22 are not limited but a linear body including a carbon nanotube (hereinafter, also referred to as "carbon nanotube linear body") is usable.

The carbon nanotube linear body is obtained by, for instance, drawing, from an end of a carbon nanotube forest (which is a grown form provided by causing a plurality of carbon nanotubes to grow on a substrate, being oriented in a vertical direction relative to the substrate, and is also referred to as "array"), the carbon nanotubes into a sheet form, and spinning a bundle of the carbon nanotubes after drawn carbon nanotube sheets are bundled. In such a producing method, a ribbon-shaped carbon nanotube linear body is obtained when the bundle of the carbon nanotubes is spun without being twisted, and a thread-shaped linear body is obtained when the bundle of the carbon nanotubes is spun while being twisted. The ribbon-shaped carbon nanotube linear body is a linear body without a structure where the carbon nanotubes are twisted. Alternatively, the carbon nanotube linear body can be obtained by, for instance, spinning from a dispersion liquid of carbon nanotubes. The production of the carbon nanotube linear body by spinning can be performed by, for instance, a method disclosed in U.S. Patent Application Publication No. 201310251619 (JP 2012-126635 A). In terms of achieving uniformity in diameter of the carbon nanotube linear bodies, it is desirable that yarn-shaped carbon nanotube linear bodies be used. In terms of obtaining carbon nanotube linear bodies with a high purity, it is preferable that the yarn-shaped carbon nanotube linear bodies be obtained by twisting the carbon nanotube sheets. The carbon nanotube linear bodies may each be a linear body provided by weaving two or more carbon nanotube linear bodies together. Alternatively, the carbon nanotube linear bodies may each be a linear body provided by combining a carbon nanotube and another conductive material (hereinafter, also referred to as "composite linear body").

Examples of the composite linear body include: (1) a composite linear body provided by causing, during a process where the carbon nanotube linear body is obtained by drawing the carbon nanotubes into a sheet form from the end of the carbon nanotube forest and spinning the bundle of the carbon nanotubes after the drawn carbon nanotube sheets are bundled, a metal alone or a metal alloy to be supported on the forest, sheet or bundle of the carbon nanotubes or a surface of the spun linear body by vapor deposition, ion plating, sputtering, wet plating, or the like; (2) a composite linear body provided by spinning the bundle of the carbon nanotubes with a linear body of a metal alone or a linear body or a composite linear body of a metal alloy, or (3) a composite linear body provided by weaving a linear body of a metal alone or a linear body or a composite linear body of a metal alloy with a carbon nanotube linear body or a composite linear body. It should be noted that regarding the composite linear body of (2), a metal may be supported on the carbon nanotubes in spinning the bundle of the carbon nanotubes as the composite linear body of (1). Further, although the composite linear body of (3) is a composite linear body provided by weaving two linear bodies, the composite linear body of (3) may be provided by weaving three or more carbon nanotube linear bodies, linear bodies of an elemental metal, or linear bodies or composite linear bodies of a metal alloy, as long as at least one linear body of an elemental metal, or linear body or composite linear body of a metal alloy is contained.

Examples of the metal for the composite linear body include elemental metals such as gold, silver, copper, iron, aluminum, nickel, chrome, tin, and zinc and alloys containing at least one of these elemental metals (a copper-nickel-phosphorus alloy, a copper-iron-phosphorus-zinc alloy, etc.). One of these may be used alone or two or more thereof may be used in combination.

The conductive linear bodies 22 may each be a linear body in a form of a conductive-coated yarn. Examples of the yarn include yarns made of resins such as nylon and polyester by spinning. Examples of the conductive coating include coating films of a metal, a conductive polymer, and a carbon material. The conductive coating can be formed by plating, vapor deposition, or the like. The linear body including the conductive-coated yarn can be improved in conductivity of the linear body with flexibility of the yarn maintained. In other words, a reduction in resistance of the quasi-sheet structure 20 is facilitated.

The conductive linear bodies 22 may each be a linear body including a metal wire. The linear body including the metal wire may be a linear body formed of a single metal wire or a linear body made by spinning a plurality of metal wires.

Examples of the metal wire include wires containing metals, such as copper, aluminum, tungsten, iron, molybdenum, nickel, titanium, silver, and gold, or alloys containing two or more metals (e.g., stainless steel, iron and steel such as carbon steel, brass, phosphor bronze, zirconium-copper alloy, beryllium copper, iron nickel, Nichrome, nickel titanium, Kanthal, Hastelloy, and rhenium tungsten). Further, the metal wire may be plated with tin, zinc, silver, nickel, chrome, a nickel-chrome alloy, solder, or the like or have a surface coated with a carbon material or a polymer described later. In particular, a wire containing one or more metals selected from among tungsten and molybdenum and alloys containing tungsten and molybdenum is preferable in terms of providing the conductive linear bodies 22 with a low volume resistivity.

The examples of the metal wire also include a metal wire coated with a carbon material. Coating the metal wire with the carbon material serves to easily make the presence of the metal wire less noticeable with a metallic luster reduced. In addition, coating the metal wire with the carbon material also serves to reduce metal corrosion.

Examples of the carbon material for coating the metal wire include amorphous carbon (e.g., carbon black, activated carbon, hard carbon, soft carbon, mesoporous carbon, and carbon fiber), graphite, fullerene, graphene, and carbon nanotube.

Adhesive Agent Layer

The adhesive agent layer 30 is a layer containing an adhesive agent. The sheet-shaped conductive member 10 includes the quasi-sheet structure 20 with the second surface 20B on which the adhesive agent layer 30 is stacked, which makes it easy to stick the sheet-shaped conductive member 10 to an adherend by virtue of the adhesive agent layer 30. It should be noted that the adhesive agent layer 30 is a layer that is provided as required. The sheet-shaped conductive member 10 can be bonded to an adherend with the first surface 20A facing the adherend. In this case, the first adhesive surface 30A of the adhesive agent layer 30 exposed through the quasi-sheet structure 20 in the sheet-shaped conductive member 10 makes it easy to bond the sheet-shaped conductive member 10 to the adherend as described above.

The adhesive agent layer 30 may be curable. With the adhesive agent layer 30 cured, a hardness sufficient for protecting the quasi-sheet structure 20 is provided to the adhesive agent layer 30, allowing the adhesive agent layer 30 to also function as a protection film. In addition, the cured adhesive agent layer 30 is improved in impact resistance, so that deformation of the cured adhesive agent layer 30 due to impact can be reduced.

It is preferable that the adhesive agent layer 30 be curable with an energy ray such as an ultraviolet ray, a visible energy ray, an infrared ray, or an electron ray so that it can easily be cured in a short time. It should be noted that "curing with an energy ray" includes thermal curing by energy-ray heating.

Conditions for curing with an energy ray are different depending on an energy ray used. For instance, in a case where the curing is performed by ultraviolet irradiation, an irradiation amount of the ultraviolet ray is preferably in a range from 10 mJ/cm$^2$ to 3,000 mJ/cm$^2$ and an irradiation time is preferably in a range from 1 second to 180 seconds.

Examples of the adhesive agent in the adhesive agent layer 30 also include a so-called heat seal type that enables thermal bonding and an adhesive agent that exhibits stickiness when wetted. However, it is preferable that the adhesive agent layer 30 be a sticky agent layer formed of a sticky agent (a pressure-sensitive adhesive agent) in terms of easiness in application. The sticky agent in the sticky agent layer is not limited. Examples of the sticky agent include an acrylic sticky agent, a urethane sticky agent, a rubber sticky agent, a polyester sticky agent, a silicone sticky agent, and a polyvinyl ether sticky agent. Among the above, the sticky agent is preferably at least one selected from the group consisting of an acrylic sticky agent, a urethane sticky agent, and a rubber sticky agent, more preferably an acrylic sticky agent.

Examples of an acrylic sticky agent include a polymer including a constituent unit derived from alkyl (meth)acrylate having a linear alkyl group or a branched alkyl group (i.e., a polymer with at least alkyl (meth)acrylate polymerized) and an acrylic polymer including a constituent unit derived from a (meth)acrylate with a ring structure (i.e., a polymer with at least a (meth)acrylate with a ring structure polymerized). Herein, the "(meth)acrylate" is used as a term referring to both "acrylate" and "methacrylate" and the same applies to other similar terms.

In a case where the acrylic polymer is a copolymer, a manner of copolymerization is not limited. The acrylic copolymer may be any one of a block copolymer, a random copolymer, and a graft copolymer.

Among the above, an acrylic copolymer including a constituent unit (a1) derived from alkyl (meth)acrylate (a1') having a chain alkyl group having 1 to 20 carbon atoms (hereinafter, also referred to as "monomer component (a1')") and a constituent unit (a2) derived from a functional-group-containing monomer (a2') (hereinafter, also referred to as "monomer component (a2')") is preferable as the acrylic sticky agent.

It should be noted that the acrylic copolymer may further include a constituent unit (a3) derived from a monomer component (a3') other than the monomer component (a1') and the monomer component (a2').

In terms of an improvement in adhesion properties, the number of the carbon atoms of the chain alkyl group of the monomer component (a1') is preferably in a range from 1 to 12, more preferably in a range from 4 to 8, further preferably in a range from 4 to 6. Examples of the monomer component (a1') include methyl (meth)acrylate, ethyl (meth)acrylate, propyl (meth)acrylate, n-butyl (meth)acrylate, 2-ethylhexyl (meth)acrylate, lauryl (meth)acrylate, tridecyl (meth)acrylate, and stearyl (meth)acrylate. Among these monomer components (a1'), butyl (meth)acrylate and 2-ethythexyl (meth)acrylate are preferable and butyl (meth)acrylate is more preferable.

The content of the constituent unit (a1) relative to all the constituent units of the acrylic copolymer (100 mass %) is preferably in a range from 50 mass % to 99.5 mass %, more preferably in a range from 55 mass % to 99 mass %, further preferably in a range from 60 mass % to 97 mass %, particularly preferably in a range from 65 mass % to 95 mass %.

Examples of the monomer component (a2') include a hydroxy-group-containing monomer, a carboxy-group-containing monomer, an epoxy-group-containing monomer, an amino-group-containing monomer, a cyano-group-containing monomer, a keto-group-containing monomer, and an alkoxysilyl-group-containing monomer. Among these monomer components (a2'), a hydroxy-group-containing monomer and a carboxy-group-containing monomer are preferable.

Examples of a hydroxy-group-containing monomer include 2-hydroxyethyl (meth)acrylate, 2-hydroxypropyl (meth)acrylate, 2-hydroxybutyl (meth)acrylate, 3-hydroxybutyl (meth)acrylate, and 4-hydroxybutyl (meth)acrylate, among which 2-hydroxyethyl (meth)acrylate is preferable.

Examples of a carboxy-group-containing monomer include a (meth)acrylic acid, a maleic acid, a fumaric acid, and an itaconic acid, among which a (meth)acrylic acid is preferable.

Examples of an epoxy-group-containing monomer include glycidyl (meth)acrylate.

Examples of an amino-group-containing monomer include diaminoethyl (meth)acrylate.

Examples of a cyano-group-containing monomer include acrylonitrile.

The content of the constituent unit (a2) relative to all the constituent units of the acrylic copolymer (100 mass %) is preferably in a range from 0.1 mass % to 50 mass %, more preferably in a range from 0.5 mass % to 40 mass %, further preferably in a range from 1.0 mass % to 30 mass %, particularly preferably in a range from 1.5 mass % to 20 mass %.

Examples of the monomer component (a3) include a (meth)acrylate having a ring structure (e.g., cyclohexyl (meth)acrylate, benzil (meth)acrylate, isobornyl (meth)acrylate, dicyclopentanyl (meth)acrylate, dicyclopentenyl (meth)acrylate, dicyclopentenyloxyethyl (meth)acrylate, imide (meth)acrylate, and acryloylmorpholine), vinyl acetate, and styrene.

The content of the constituent unit (a3) relative to all the constituent units of the acrylic copolymer (100 mass %) is preferably in a range from 0 mass % to 40 mass %, more preferably in a range from 0 mass % to 30 mass %, further preferably in a range from 0 mass % to 25 mass %, particularly preferably in a range from 0 mass % to 20 mass %.

It should be noted that the above monomer components (a1') may be used alone or two or more thereof may be used in combination, the above monomer components (a2') may be used alone or two or more thereof may be used in combination, and the above monomer components (a3') may be used alone or two or more thereof may be used in combination.

The acrylic copolymer may be cross-linked by a cross-linker. Examples of the cross-linker include a known epoxy cross-linker, isocyanate cross-linker, aziridine cross-linker, and metal chelate cross-linker. In cross-linking the acrylic copolymer, a functional group derived from the monomer component (a2) can be used as a cross-link point to react with the cross-linker.

The adhesive agent layer 30 may further contain an energy-ray curable component in addition to the above sticky agent.

Examples of the energy-ray curable component include, in a case where the energy ray is, for instance, an ultraviolet ray, a compound having two or more UV-polymerizable functional groups in one molecule, such as a multifunctional (meth)acrylate compound.

Further, in a case where the acrylic sticky agent is used as the sticky agent, a compound having afunctional group reactive with the functional group derived from the monomer component (a2') of the acrylic copolymer and an energy-ray polymerizable functional group in one molecule as the energy-ray curable component. Reaction between the functional group of the compound and the functional group derived from the monomer component (a2') of the acrylic copolymer enables a side chain of the acrylic copolymer to be polymerizable by energy ray irradiation. Even in a case where the sticky agent is not the acrylic sticky agent, a component with an energy-ray polymerizable side chain may likewise be used as a copolymer component other than the copolymer that serves as the sticky agent.

In a case where the adhesive agent layer 30 is curable with an energy ray, it is preferable that the sticky agent layer contain a photopolymerization initiator. The photopolymerization initiator enables increasing a speed at which the sticky agent layer is cured by energy ray irradiation.

The adhesive agent layer 30 may contain an inorganic filler. With the inorganic filler contained, a hardness of the cured adhesive agent layer 30 can be further improved. In addition, a heat conductivity of the adhesive agent layer 30 is improved. Further, in a case where an adherend contains glass as a main component, linear expansion coefficients of the sheet-shaped conductive member 10 and the adherend can be closer to each other, thereby improving reliability of a conductive-sheet-equipped article provided by sticking the sheet-shaped conductive member 10 to the adherend and, as required, curing the sheet-shaped conductive member 10.

Examples of the inorganic filler include inorganic powder (e.g., powders of silica, alumina, talc, calcium carbonate, titanium white, colcothar, silicon carbide, and boron nitride), beads of spheroidized inorganic powder, single crystal fiber, and glass fiber. Among the above, a silica filler and an alumina filler are preferable as the inorganic filler. The inorganic fillers may be used alone or two or more thereof may be used in combination.

Other components may be contained in the adhesive agent layer 30. Examples of other components include known additives such as an organic solvent, a flame retardant, a tackifier, an ultraviolet absorber, an antioxidant, a preservative, an antifungal agent, a plasticizer, a defoamer, and a wettability modifier.

A thickness of the adhesive agent layer 30 is determined as desired in accordance with an intended use of the sheet-shaped conductive member 10. For instance, the thickness of the adhesive agent layer 30 is preferably in a range from 3 μm to 150 μm in terms of adhesiveness, more preferably in a range from 5 μm to 100 μm.

Examples of the base 32 include paper, a thermoplastic resin film, a cured film of a curable resin, metallic foil, and glass film. Examples of the thermoplastic resin film include rubber, silicone, polyester, polycarbonate, polyimide, polyolefin, polyurethane, and acrylic resin films. Further, it is preferable that the base 32 exhibit stretchability.

It should be noted that a surface of the base 32 not facing the quasi-sheet structure 20 may be subjected to, for instance, a hard coating treatment with an ultraviolet curable resin or the like to enhance protectiveness for the sheet-shaped conductive member 10 (quasi-sheet structure 20).

Method of Producing Sheet-Shaped Conductive Member

A method of producing the sheet-shaped conductive member 10 according to the exemplary embodiment is not limited. The sheet-shaped conductive member 10 is produced through, for instance, the following process.

First, a composition for forming the adhesive agent layer 30 is applied on the base 32 to form a coating film. Subsequently, the coating film is dried to produce the adhesive agent layer 30. Subsequently, the conductive linear bodies 22 are disposed on the first adhesive surface 30A of the adhesive agent layer 30 while being arranged, thereby forming the quasi-sheet structure 20. For instance, while a drum member is turned with the adhesive agent layer 30 attached with the base 32 disposed on an outer circumferential surface of the drum member, the conductive linear bodies 22 are helically wound on the first adhesive surface 30A of the adhesive agent layer 30. A bundle of the helically wound conductive linear bodies 22 is then cut along an axial direction of the drum member. The quasi-sheet structure 20 is thus formed while disposed on the first adhesive surface 30A of the adhesive agent layer 30. Then, the adhesive agent layer 30 attached with the base 32, on which the quasi-sheet structure 20 is formed, is taken off the drum member, thereby obtaining the sheet-shaped conductive member 10. According to this method, the interval L between adjacent ones of the conductive linear bodies 22 of the quasi-sheet structure 20 is easily adjusted by, for instance, moving a feeder of the conductive linear bodies 22 along a direction parallel with an axis of the drum member while turning the drum member.

It should be noted that after the quasi-sheet structure 20 is formed by arranging the conductive linear bodies 22, the second surface 20B of the obtained quasi-sheet structure 20 may be stuck onto the first adhesive surface 30A of the adhesive agent layer 30 to produce the sheet-shaped conductive member 10.

Properties of Sheet-Shaped Conductive Member

In a case where the sheet-shaped conductive member 10 is required to have transparency, light transmittance of the sheet-shaped conductive member 10 according to the exemplary embodiment is preferably 70% or more, more preferably in a range from 70% to 100%, further preferably in a range from 80% to 100%.

It should be noted that the light transmittance of the sheet-shaped conductive member 10 (quasi-sheet structure 20) is an average value of results of measuring light transmittance in a visible range (380 nm to 760 nm) with alight transmissometer.

A surface resistance ($\Omega/\square=\Omega/sq.$) of the sheet-shaped conductive member 10 according to the exemplary embodiment is preferably 800$\Omega/\square$ or less, more preferably in a range from 0.01 L/o to 500$\Omega/\square$, further preferably in a range from 0.05$\Omega/\square$ to 300$\Omega/\square$. In a case where the sheet-shaped conductive member 10 is used as a heat-generating element, the sheet-shaped conductive member 10 with a low surface resistance is required in terms of a reduction in a voltage to apply. At the surface resistance of the sheet-shaped conductive member 10 of 800$\Omega/\square$ or less, the voltage to apply is easily reduced.

It should be noted that the surface resistance of the sheet-shaped conductive member 10 is measured by the following method. First, to improve electrical connection, a silver paste is applied to both ends of the quasi-sheet structure 20 of the sheet-shaped conductive member 10. Subsequently, the sheet-shaped conductive member 10 is stuck to a glass substrate with copper tapes stuck on both ends thereof such that the silver paste and the copper tapes are in contact with each other and then resistance is measured with an electric tester to calculate the surface resistance of the sheet-shaped conductive member 10.

Method of Producing Conductive-Sheet-Equipped Article

Next, description will be made on a method of producing a conductive-sheet-equipped article according to the exemplary embodiment.

The method of producing a conductive-sheet-equipped article according to the exemplary embodiment includes a step of forming an electrodes on an adherend to obtain an electrodes-equipped adherend (an electrodes formation step) and a step of stretching a sheet-shaped conductive member and sticking the sheet-shaped conductive member to the electrodes-equipped adherend (a sheet sticking step).

Figure 3A:
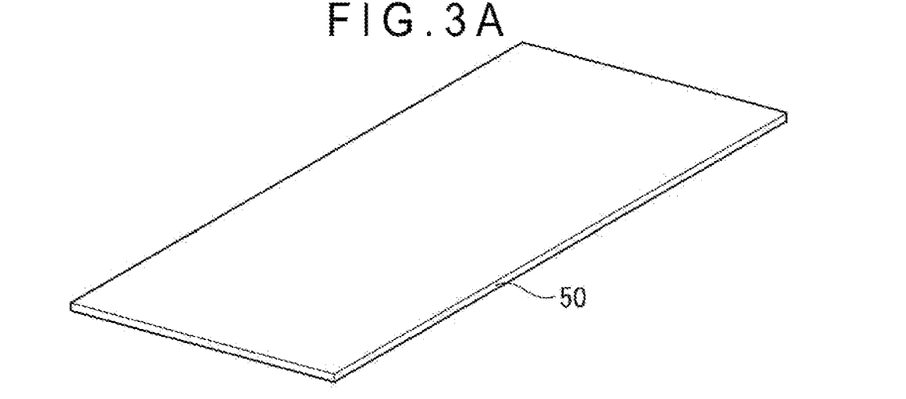
FIG. 3A is a diagram for explaining a method of producing an article equipped with a conductive sheet according to the first exemplary embodiment of the invention.

In the electrodes formation step, an adherend 50 as shown in FIG. 3A is first prepared.

The adherend 50 is not limited to a sheet-shaped article. Examples of the adherend 50 include a compact, non-woven fabric, and woven fabric. A material of the compact is not limited as long as the material is a substance with a surface having electricity blocking properties. Examples of the material of the compact include plastics, glass, ceramics, stone, wood, laminated pulp, and metal with insulation coating.

For instance, in a case where the sheet-shaped conductive member 10 is used as a heat-generating element, examples of the intended use of the heat-generating element include a defogger and a deicer. In this case, examples of the adherend 50 include a mirror for a bathroom, etc., a window for a transportation device (a passenger vehicle, a train, a ship, an airplane, etc.), a window for a building, an eyewear, alighting surface of a traffic light, and a sign. In addition, in a case where the adherend 50 is a compact, a surface of the compact used for an enclosure of an electrical product, a vehicle interior part, a building material/Interior material, or the like may be subjected to a three dimensional molding method such as TOM (Three dimension Overlay Method) molding, film insert molding, or vacuum molding so that the compact is coated to serve as a heat-generating element or any other conductive functional material.

Figure 3B:
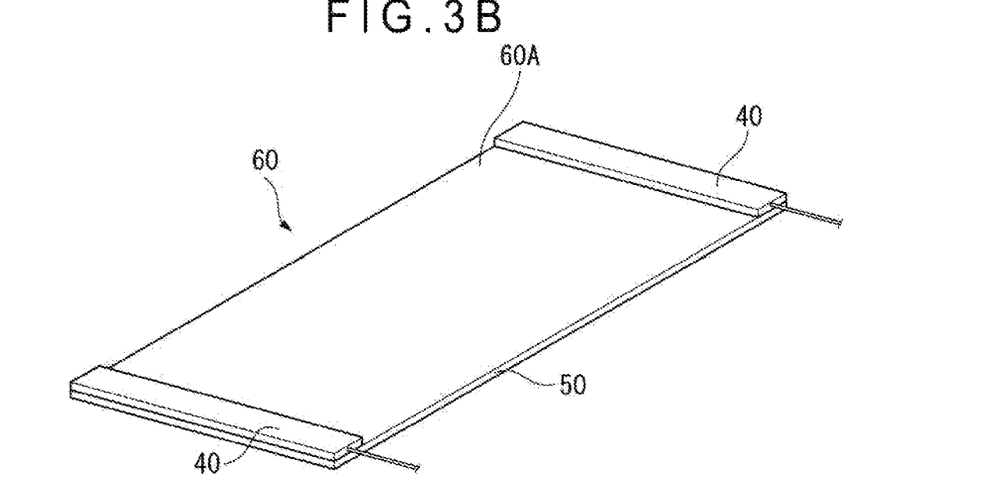
FIG. 3B is a diagram for explaining the method of producing the article equipped with the conductive sheet according to the first exemplary embodiment of the invention.

In the electrodes formation step, an electrodes 40 is subsequently formed on the adherend 50 as shown in FIG. 3B, thereby obtaining an electrodes-equipped adherend 60.

A known method can be used as a method of forming the electrodes 40 as appropriate. Examples of the method of forming the electrodes 40 include a method in which a conductive adhesive agent is used, a method in which a metallic foil or a metallic tape is stuck, and a method in which a deposited film is formed.

Figure 3C:
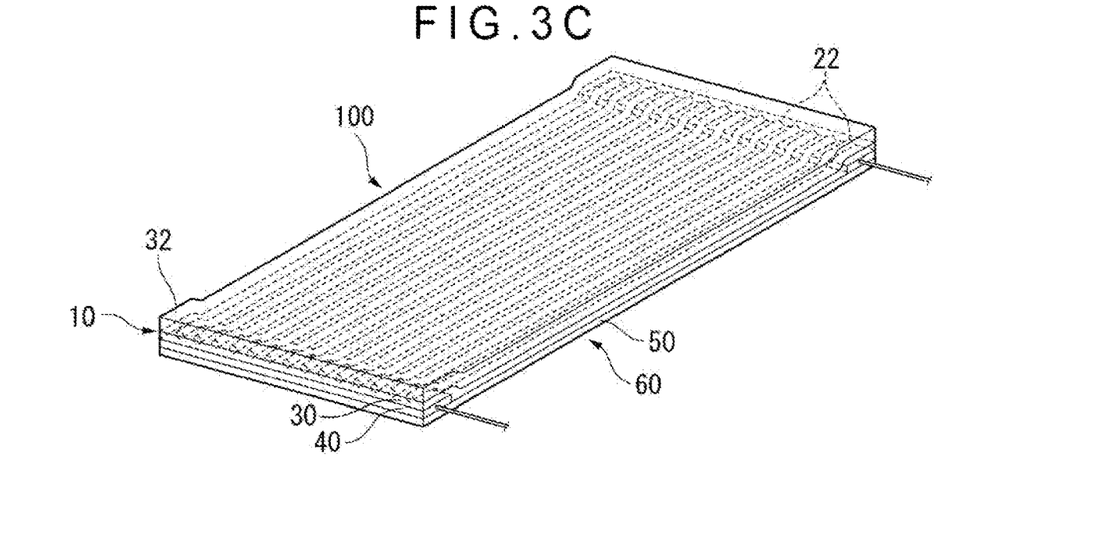
FIG. 3C is a diagram for explaining the method of producing the article equipped with the conductive sheet according to the first exemplary embodiment of the invention.

In the sheet sticking step, the sheet-shaped conductive member 10 is stretched with the first surface 20A of the quasi-sheet structure 20 and a surface 60A of the electrodes-equipped adherend 60 on which the electrodes 40 is formed facing each other and stuck to the electrodes-equipped adherend 60. A conductive-sheet-equipped article 100 as shown in FIG. 3C is thus obtained.

The conductive linear bodies 22 will not be cut even when the sheet-shaped conductive member 10 is stretched in the direction perpendicular to the length direction of the conductive linear bodies 22. Thus, for instance, the sheet-shaped conductive member 10 can be stretched in the direction perpendicular to the length direction of the conductive linear bodies 22 and stuck to the electrodes-equipped adherend 60.

Effects of First Exemplary Embodiment

The exemplary embodiment can achieve the following effects.

(1) In the exemplary embodiment, the electrodes 40 do not stretch in stretching and sticking the sheet-shaped conductive member 10. Thus, in stretching and sticking the sheet-shaped conductive member 10, generation of a crack in the electrodes 40 can be prevented and the sheet-shaped conductive member 10 is prevented from failing to stretch because the electrodes 40 do not stretch, which makes the sheet-shaped conductive member 10 conformable to a curved surface of the adherend 50, or the like.

(2) In the exemplary embodiment, the sheet-shaped conductive member 10 and the electrodes 40 are separate members.

Thus, for instance, in a case where a part of the sheet-shaped conductive member 10 needs revising, it is possible to revise only the sheet-shaped conductive member 10. In other words, in revising the design, adjustments of the electrodes 40 and the sheet-shaped conductive member 10 can be separately considered.

(3) In the exemplary embodiment, the sheet-shaped conductive member 10 is stuck to the electrodes-equipped adherend 60 with the first surface 20A of the quasi-sheet structure 20 and the surface of the electrodes-equipped adherend 60 on which the electrodes 40 is formed facing each other. This allows the quasi-sheet structure 20 and the electrodes 40 to come into direct contact with each other to achieve electrical connection. It should be noted that as long as the quasi-sheet structure 20 and the electrodes 40 can be bought into contact with each other as described later, a second adhesive agent layer, an auxiliary electrodes, or the like may be interposed between the first surface 20A of the quasi-sheet structure 20 and the electrodes 40.

In addition, in the exemplary embodiment, in a case where the sheet-shaped conductive member 10 includes the adhesive agent layer 30, the following effect can further be achieved.

(4) The sheet-shaped conductive member 10 is stuck to the electrodes-equipped adherend 60 via the adhesive agent layer 30, whereby the sheet-shaped conductive member 10 can be fixed on an installation surface.

In addition, in the exemplary embodiment, in a case where the sheet-shaped conductive member 10 includes the adhesive agent layer 32, the following effect can further be achieved.

(5) The sheet-shaped conductive member 10 includes the base 32 on a side distant from the adherend 50 with respect to the quasi-sheet structure 20, so that the quasi-sheet structure 20 and the electrodes 40 can be protected by the base 32.

Second Exemplary Embodiment

Next, description will be made on a second exemplary embodiment of the invention (not shown).

It should be noted that this exemplary embodiment is similar in configuration to the first exemplary embodiment except that a sheet-shaped conductive member 10A is used in place of the sheet-shaped conductive member 10. Accordingly, the sheet-shaped conductive member 10A will be described and description of the other components will be omitted.

The sheet-shaped conductive member 10A according to this exemplary embodiment includes a release sheet stacked on the second adhesive surface 30B of the adhesive agent layer 30.

Examples of the release sheet include a sheet including a release sheet base and a release layer. Examples of the release sheet base include the same base as that used as the base 32. Examples of the release layer include a coating film of a silicone release agent, a fluorine release agent, and an alkyd release agent provided on the release sheet base.

Effects of Second Exemplary Embodiment

This exemplary embodiment can achieve effects similar to the effects (1) to (4) of the above first exemplary embodiment and the following effect (5').

(5') in the exemplary embodiment, the sheet-shaped conductive member 10A includes the release sheet on a side distant from the adherend 50 with respect to the quasi-sheet structure 20. Thus, shape retainability of the sheet-shaped conductive member 10A can be maintained by virtue of the release sheet and, further, the release sheet can be peeled and removed after the sheet-shaped conductive member 10A is stuck to an adherend. It should be noted that it is preferable that the adhesive agent layer 30 be curable in the second exemplary embodiment. With the adhesive agent layer 30 cured after the sheet-shaped conductive member 10A is stuck to an adherend, the quasi-sheet structure 20 and the electrodes 40 can be protected by a coating film of the cured adhesive agent layer 30 even after the release sheet is removed.

Third Exemplary Embodiment

Next, description will be made on a third exemplary embodiment of the invention with reference to the attached drawing.

It should be noted that this exemplary embodiment is similar in configuration to the first exemplary embodiment or the second exemplary embodiment except that a sheet-shaped conductive member 101 is used in place of the sheet-shaped conductive member 10. Accordingly, the sheet-shaped conductive member 10B will be described and description of the other components will be omitted.

Figure 4:
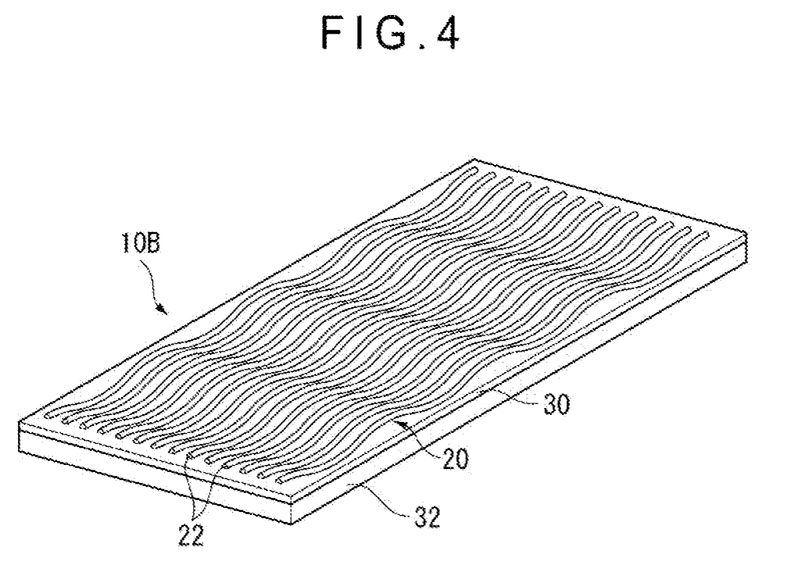
FIG. 4 is a schematic view of a sheet-shaped conductive member according to a third exemplary embodiment of the invention.

In the sheet-shaped conductive member 10B according to this exemplary embodiment, the conductive linear bodies 22 are each in a wavy shape in a plan view of the sheet-shaped conductive member 10B as shown in FIG. 4. Specifically, the conductive linear bodies 22 may each be in a wavy shape such as a sinusoidal wave, a rectangular wave, a triangular wave, or a sawtooth wave. In other words, the quasi-sheet structure 20 may have a structure in which, for instance, the plurality of conductive linear bodies 22 in a wavy shape extending to one side are arranged at regular intervals in a direction (axial direction) perpendicular to a direction of the extension of the conductive linear bodies 22. Each of the conductive linear bodies 22 may be in a wavy shape as a whole or only partially in a wavy shape while the other part is in a linear shape or the like. Further, two or more wavy shapes (e.g., a sinusoidal wave and a triangular wave) may be combined for each of the conductive linear bodies 22 and the wavy shape of each of the conductive linear bodies 22 may be different in type from the wavy shape of another conductive linear body 22. To efficiently achieve effects of this exemplary embodiment described below, it is preferable that all the conductive linear bodies 22 in the quasi-sheet structure 20 each have at least a part in a wavy shape.

Effects of Third Exemplary Embodiment

This exemplary embodiment can achieve effects similar to the effects (1) to (5) and (5') of the above first exemplary embodiment and the above second exemplary embodiment and the following effect (6).

(6) In this exemplary embodiment, the conductive linear bodies 22 are each in a wavy shape in a plan view of the sheet-shaped conductive member 10B. This allows for keeping the conductive linear bodies 22 from being cut even when the sheet-shaped conductive member 10B is stretched in the length direction (axial direction) of the conductive linear bodies 22. In other words, the sheet-shaped conductive member 10B is stretchable not only in the direction perpendicular to the length direction (axial direction) of the conductive linear bodies 22 but also in the length direction (axial direction) of the conductive linear bodies 22. The sheet-shaped conductive member 10B can thus be conformable to the curved surface of the adherend 50 with a higher reliability.

To further enhance such an effect, it is preferable that the wavy shape have a less linear part and the wavy shape be a sinusoidal wave.

Fourth Exemplary Embodiment

Next, description will be made on a fourth exemplary embodiment of the invention with reference to the attached drawing.

It should be noted that in this exemplary embodiment, description will be made on an implementation of the conductive-sheet-equipped article obtained by the method of producing a conductive-sheet-equipped article according to one of the above first exemplary embodiment to the above third exemplary embodiment.

Figure 5:
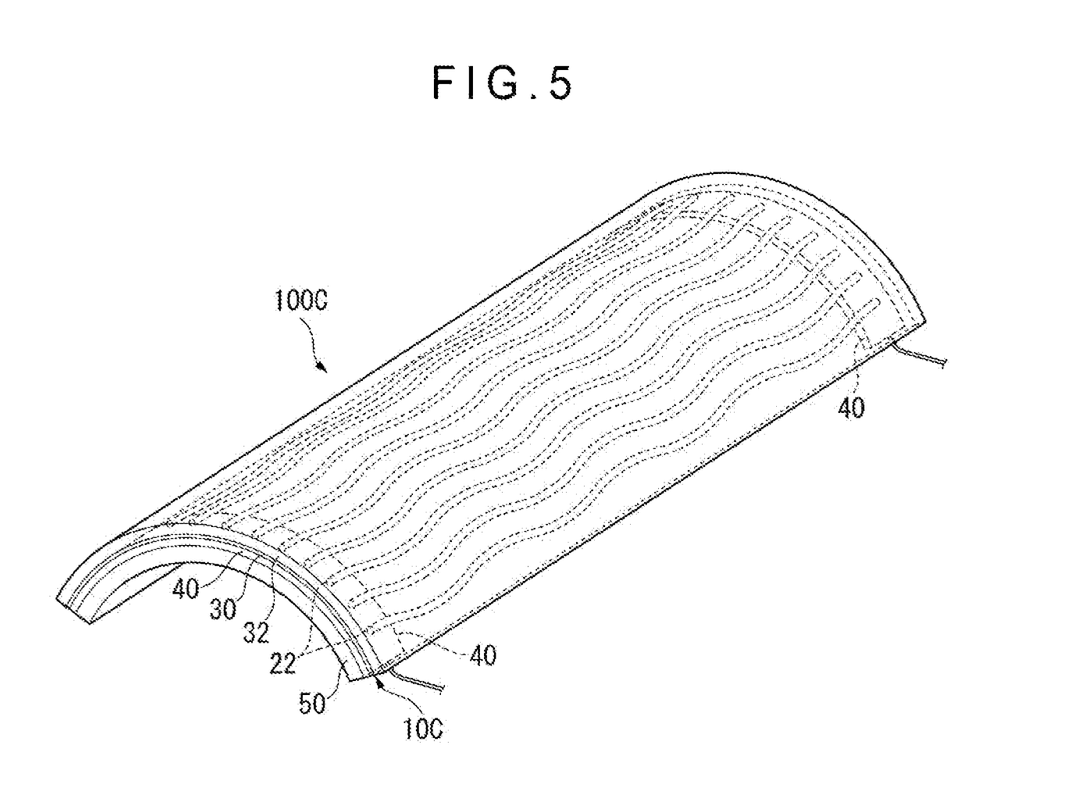
FIG. 5 is a schematic view of an article equipped with a conductive sheet according to a fourth exemplary embodiment of the invention.

A conductive-sheet-equipped article 100C according to this exemplary embodiment includes the adherend 50 with a curved surface, the non-stretchable electrodes 40 provided on at least a part of the curved surface of the adherend 50, and a sheet-shaped conductive member 10C provided on the curved surface of the adherend 50 and on the electrodes 40 and including the quasi-sheet structure 20 in which the plurality of conductive linear bodies 22 are arranged at the interval.

The curved surface herein includes a surface with a corner or a bend and a surface with unevenness.

The non-stretchable electrodes 40 refer to electrodes that will have a crack or the like if bent or stretched. Examples of the non-stretchable electrodes 40 include an electrode provided by vapor deposition, an electrodes provided by a metallic foil or a metallic tape, and an electrodes provided by a conductive adhesive agent. It is preferable that the electrodes 40 be in a belt-shape as shown in FIG. 5. In this case, the electrodes 40 are preferably substantially perpendicular to the length direction (axial direction) of the conductive linear bodies 22 arranged at the interval, more preferably perpendicular thereto.

The conductive linear bodies 22 are similar to the linear bodies of the above first exemplary embodiment. In the sheet-shaped conductive member 10C according to this exemplary embodiment, it is preferable that the conductive linear bodies 22 be each in a wavy shape in a plan view of the sheet-shaped conductive member 10C as shown in FIG. 5.

Effects of Fourth Exemplary Embodiment

This exemplary embodiment, which can employ the method of producing a conductive-sheet-equipped article according to one of the above first exemplary embodiment to the above third exemplary embodiment, can achieve effects similar to the effects (1) to (6) and (5') of these exemplary embodiments.

Specifically, in this exemplary embodiment, the adherend 50 has the curved surface and the electrodes 40 are non-stretchable. However, the electrodes 40 can be provided on the curved surface of the adherend 50, being not to be stretched later. Meanwhile, in a case where the conductive linear bodies 22 are each in a wavy shape in a direction perpendicular to at least the length direction (axial direction) of the conductive linear bodies 22, the sheet-shaped conductive member 10C is stretchable in the length direction (axial direction) of the conductive linear bodies 22. Accordingly, even when the adherend 50 has the curved surface, the conductive-sheet-equipped article 100C in which a crack is not to be generated in the electrodes 40 and the conductive linear bodies 22 are not to be cut is obtained.

Modifications of Exemplary Embodiments

The scope of the invention is not limited to the above exemplary embodiments, and modifications, improvements, etc. are included within the scope of the invention as long as they are compatible with an object of the invention.

For instance, although the quasi-sheet structure 20 is in the form of a single layer in the above exemplary embodiments, the scope of the invention is not limited thereto. For instance, the sheet-shaped conductive member 10 may be in the form of a sheet including a plurality of quasi-sheet structures 20 arranged in a sheet-plane direction (a direction along a sheet surface). The plurality of quasi-sheet structures 20 may be arranged with the respective conductive linear bodies 22 being in parallel with each other or intersecting each other in a plan view of the sheet-shaped conductive member 10.

In the above exemplary embodiments, the sheet-shaped conductive member 10 does not necessarily include the adhesive agent layer 30 and, for instance, the quasi-sheet structure 20 may be provided directly on the base 32.

Further, in the above exemplary embodiments, the second adhesive agent layer may be provided on the first surface 20A of the quasi-sheet structure 20 and only the second adhesive agent layer may be provided while no adhesive agent layer is provided on the second surface 20B of the quasi-sheet structure 20. In these cases, it is preferable that a pressure be applied to the sheet-shaped conductive member 10 at the same time as or after the sheet-shaped conductive member 10 is stuck to the adherend to sink the conductive linear bodies 22 into the second adhesive agent layer, bringing the conductive linear bodies 22 into contact with the electrodes 40.

The invention claimed is:

1. A method of producing a conductive-sheet-equipped article, the conductive-sheet-equipped article comprising:
    an adherend having a curved surface;
    non-stretchable electrodes provided at least partly on the curved surface of the adherend; and
    a sheet-shaped conductive member provided on the curved surface of the adherend and on the electrodes and comprising a quasi-sheet structure comprising a plurality of conductive linear bodies arranged at an interval,
    wherein the sheet-shaped conductive member further comprises an adhesive agent layer,
    the method comprising:
    forming the electrodes on the adherend to obtain an electrode-equipped adherend; and
    stretching the sheet-shaped conductive member in a direction perpendicular to a length direction of the conductive linear bodies and sticking the sheet-shaped conductive member to the electrode-equipped adherend.

2. The method of producing a conductive-sheet-equipped article according to claim 1, wherein the conductive linear bodies each comprise at least one selected from the group consisting of a linear body comprising a metal wire, a linear body comprising a carbon nanotube, and a linear body in a form of a conductive-coated yarn.

3. The method of producing a conductive-sheet-equipped article according to claim 1, wherein the sheet-shaped conductive member further comprises a base, and a side of the sheet-shaped conductive member where the quasi-sheet structure is provided is stuck to the electrodes-equipped adherend.

4. The method of producing a conductive-sheet-equipped article according to claim 1, wherein the conductive linear bodies are each in a wavy shape in a plan view of the sheet-shaped conductive member.

5. The method of producing a conductive-sheet-equipped article according to claim 1, wherein a diameter of each of the conductive linear bodies is in a range from 8 µm to 60 µm, and an interval between the conductive linear bodies is in a range from 0.3 mm to 12.0 mm.

6. The method of producing a conductive-sheet-equipped article according to claim 1, wherein the adhesive agent layer contains an inorganic filler.

* * * * *